United States Patent [19]

Illy et al.

[11] 4,158,724
[45] Jun. 19, 1979

[54] TRIS-TETRAZOLES AS CHEMICAL BLOWING AGENTS

[75] Inventors: Hugo Illy, Reinach; Werner Fussenegger, Basel, both of Switzerland

[73] Assignee: Ciba-Geigy Corporation, Ardsley, N.Y.

[21] Appl. No.: 941,440

[22] Filed: Sep. 11, 1978

Related U.S. Application Data

[62] Division of Ser. No. 839,679, Oct. 5, 1977, Pat. No. 4,127,718.

[30] Foreign Application Priority Data

Oct. 18, 1976 [CH] Switzerland ............... 013163/76

[51] Int. Cl.$^2$ .................. C08J 9/10; C07D 251/04
[52] U.S. Cl. .................................... 521/90; 521/143; 521/146; 521/180; 521/182; 521/184; 521/185; 521/189; 554/222
[58] Field of Search .................. 521/90, 180; 544/222

[56] References Cited

U.S. PATENT DOCUMENTS

| | | | |
|---|---|---|---|
| 3,442,829 | 5/1969 | Moore et al. | 521/143 |
| 3,873,477 | 3/1975 | Beck et al. | 521/143 |

*Primary Examiner*—Morton Foelak

*Attorney, Agent, or Firm*—Luther A. R. Hall

[57] ABSTRACT

Tris-tetrazoles of formula I,

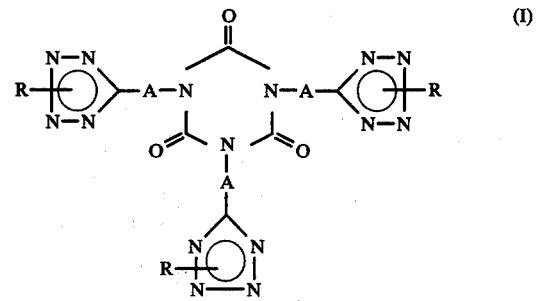

wherein A is alkylene and R is hydrogen, alkyl or phenyl, are suitable blowing agents for thermoplastic resins, especially for polycarbonates and aromatic polyethers. The foaming process can be carried out at a temperature range of 230° to 300° C., the resulting foamed articles have a fine and homogeneous cellular structure.

The tris-tetrazoles I can be synthesized from the corresponding tris-nitriles or tris-imidchlorides by reaction with an alkali azide.

6 Claims, No Drawings

TRIS-TETRAZOLES AS CHEMICAL BLOWING AGENTS

This is a divisional of application Ser. No. 839,679 filed on Oct. 5, 1977, now U.S. Pat. No. 4,127,718, issued on Nov. 28, 1978.

The invention relates to a process for foaming thermoplastic materials (thermoplasts) by adding chemical blowing agents which decompose when heated and give off gas.

The production of foamed moulded shapes from thermoplastics by the addition of chemical blowing agents in the moulding process, for example during injection moulding or extrusion, has been known for a long time. The decomposition of the blowing agent occurs in the plasticised thermoplastic material, and the decomposition temperature should be between the softening temperature of the thermoplastic material and the maximum processing temperature. The decomposition temperature of the blowing agent should preferably be about 20° C. below the maximum processing temperature in order to obtain a homogeneous cellular structure and maximum utilisation of the blowing agent.

The decomposition of the blowing agent has therefore to occur within a relatively narrow temperature range. The gas formed on decomposition should be odorless and inert. The blowing agent should break down completely into gaseous decomposition products, or alternatively the non-gaseous decomposition products should be soluble in the plastics material, and must not lead to discoloration or to changes in the physical or chemical properties of the plastics material.

The blowing agents hitherto known do not in most cases satisfy all these requirements, and are therefore suitable mainly only for specific fields of application. Thus, for example, organic hydrazides and semicarbazides split off ammonia, as a result of which polyesters or polycarbonates can be ammonolytically broken down. The known azodicarbonamide forms solid decomposition residues which are insoluble in the customary thermoplasts. Its use moreover is associated with a considerable smell contamination during foaming. 5-Phenyltetrazole has already been suggested as a blowing agent, especially for the foaming of thermoplasts having relatively high processing temperatures. This blowing agent leads neither to a smell nuisance nor to a formation of residues; it produces however a gas yield lower than that of azodicarbonamide.

It was the object of the invention to find chemical blowing agents for foaming thermoplastic materials, which blowing agents do not have the disadvantages described and which at the same time produce a gas yield higher than that of 5-phenyltetrazole.

It has been found that tris-tetrazoles of the formula I

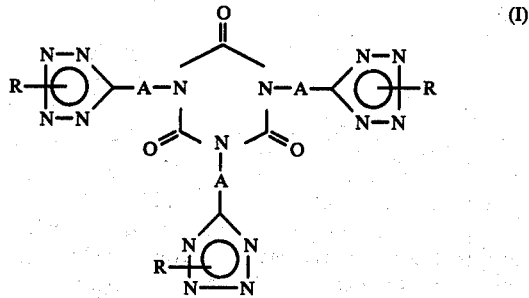

wherein A represents an alkylene group of the formula —CH$_2$—, —CH$_2$—CH$_2$— or —CH(CH$_3$)—CH$_2$— and R represents hydrogen, alkyl of 1 to 4 carbon atoms or phenyl, are suitable as blowing agents for the foaming of thermoplastic materials. Suitable compounds of the formula I are preferentially those wherein R represents hydrogen; preferred amongst these are those compounds wherein A represents —CH$_2$— or —CH$_2$—CH$_2$—. These are tris-(5-tetrazolylmethyl)-isocyanurate (compound No. 1) and tris-[2-(5-tetrazolyl)-ethyl]-isocyanurate (compound No. 2).

With regard to gas yield, the compounds are superior to the known 5-phenyltetrazole. Thus, for example, the gas yield on being heated without plastics material to 280° C. is as follows:

5-phenyltetrazole yields 174 ml/g, and
compound No. 1 yields 280 ml/g.

This means that for foaming plastics materials correspondingly lower amounts of the compounds of the formula I have to be added than of the known phenyltetrazole.

Thermoplastic materials (thermoplasts) which can be foamed according to the invention are, for example, polyolefins such as polyethylene or polypropylene, polystyrene and styrene copolymers such as IPS or ABS polymers, polyvinyl chloride, polyacetals, polycarbonates, aromatic polyethers, polysulphones and polysulphone ethers, polyesters such as polyethylene- or polybutyleneterephthalate, polyamides such as polycaprolactam, and also mixtures of such polymers. Since the decomposition temperature of the tris-tetrazoles of the formula I can be varied within certain limits by the choice of the bridge member R, plastics having different processing temperatures can be foamed. Furthermore, the decomposition temperature of blowing agents can be lowered by the addition of activators (kickers), which is possible also in the case of the tris-tetrazoles according to the invention. Examples of such activators are metal oxides or metal salts, such as zinc oxide, zinc acetate, cadmium stearate and dibutyltin oxide.

In this manner, the tris-tetrazoles of the formula I are suitable for foaming at temperatures of 200° C. to above 300° C., preferably at 230° C. to 300° C. The process according to the invention is therefore suitable preferably for the foaming of polypropylene, styrene copolymers, polycarbonates, polyamides, aromatic polyethers, polyesters and polysulphones. The process is particularly suitable for foaming polycarbonates and aromatic polyethers.

The addition of the blowing agents to the plastics can be made by dry mixing, with preferably an adhesive being added. The adhesives used can be, for example, long-chain fatty acids or salts thereof, esters or amides. The blowing agents can also be added in the dissolved form, or in the form of a masterbatch. What generally applies is that the more uniformly the blowing agent is mixed with the plastics material, the more finely porous and homogeneous the foam becomes.

The foaming of the mixture of thermoplast and foaming agent is effected by known processes comprising heating with simultaneous moulding. The most important methods are injection moulding and extrusion.

The amount of blowing agent added depends in the first place on the degree of foaming required; it depends also on the respective gas yield from the blowing agent employed. In general, 0.05 to 5% by weight of blowing agent, preferably 0.1 to 2% by weight, is used.

The thermoplasts used can contain additives such as those customary in plastics technology, such as fillers and reinforcing agents, glass fibres, pigments, lubricants, stabilisers, antistatic agents, nucleation agents, flameproofing agents, plasticisers, emulsifiers or optical brighteners. Such additives can be added simultaneously with the blowing agents.

The compounds of the formula I are new compounds. Compounds of the formula I wherein R represents hydrogen can be obtained by reaction by cyanoalkyl-isocyanurates of the formula II

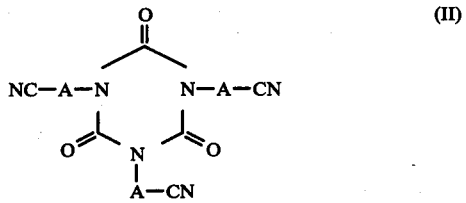

with hydrazoic acid or with a reagent supplying $HN_3$. Preferably, there is used as the reagent supplying $HN_3$ an alkali azide in the presence of a salt producing an acid reaction, preferably $NH_4CL$, and the reaction is performed in dimethylformamide.

The resulting H-tetrazoles can be converted by N-alkylation with customary alkylating agents into the N-alkyl-tetrazoles. Suitable alkylating agents are, for example, dialkylsulphates or alkyl halides. There are formed mixtures of 1- and 2-alkyl derivatives, which can be used as such for the foaming of plastics.

A method for producing 1-substituted tris-tetrazoles of the formula I is the reaction of N-substituted tris-amides of the formula

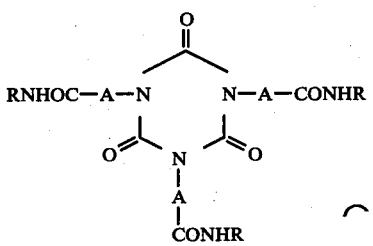

with $PCl_5$ or $SOCl_2$ to give the corresponding tris-imide chlorides, which can be converted by reaction with alkali azides into tris-tetrazoles.

The following Examples illustrate the production and use of the tris-tetrazoles of the formula I. Except where otherwise stated, 'parts' denote parts by weight, temperatures are given in degrees Centigrade, and percentages are percent by weight.

EXAMPLE 1

Tris-(5-tetrazolylmethyl)-isocyanurate 65 parts of sodium azide, 59 parts of ammonium chloride, 60 parts of tris-(cyanomethyl)-isocyanurate (obtained according to Example 3 of GB Patent Specification No. 988,631) and 200 parts of dimethylformamide are heated in the course of one hour to 140° C., and stirred for a further 5 hours at this temperature. After cooling, the reaction mixture is mixed with 1500 parts of water, and hydrochloric acid is added until the pH value is 3.5. The crude tris-tetrazole which has precipitated is recrystallised from acetonitrile to obtain white crystals which melt at 300° C.

$C_9H_9N_{15}O_3$: calculated: C, 28.81%; H, 2.42%; N, 55.99% found: C, 28.9%; H, 2.5%; N, 55.4%.

EXAMPLE 2

A commercial granulated polycarbonate which contains 5% of glass fibres and which has a viscosity number of 0.495 and a density of 1.2 g/ccm is dried for 2.5 hours in an oven at 120°. It is then premixed with 0.1% by weight of butyl stearate for 20 minutes in order to ensure the adhesion of the blowing agent; it is then mixed, by being rotated, with 0.16% by weight of tris-(5-tetrazolylmethyl)-isocyanurate, and the whole is mixed in a Rhönrad mixer for a further 20 minutes. The mixture is processed, in an injection moulding machine, into the form of rectangular plates having dimensions of 80×50×6 mm. The external cylinder temperatures where in the case of the screw 260°, 270° and 290°, and at the nozzle 280°. The cooling time in the mould was 50 seconds. The moulding obtained has a viscosity number of 0.485 and a density of 0.85 g/cm³. It has a smooth surface and a foamed core having a fine homogeneous pore structure.

The properties of the injection-moulded specimens are not unfavourably affected even by prolonged exposure to heat.

We claim:

1. Process for foaming a thermoplastic resin, which process comprises adding to the resin 0.05 to 5% by weight of a tris-tetrazole of the formula I

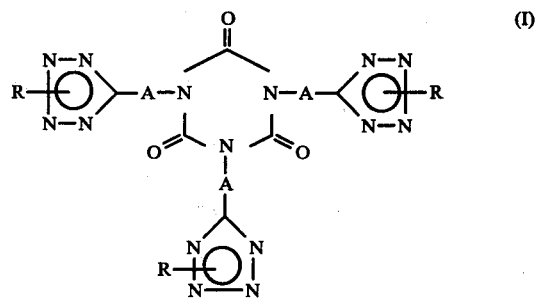

wherein A represents an alkylene radical of the formula —CH₂—, —CH₂—CH₂— or —CH(CH₃)—CH₂—, and R represents hydrogen, alkyl of 1 to 4 carbon atoms or phenyl; and heating the mixture.

2. Process according to claim 1, wherein there is added a tris-tetrazole of the formula I wherein R represents hydrogen.

3. Process according to claim 1, wherein the thermoplastic resin is polypropylene, a styrene copolymer, a polycarbonate, a polyamide, an aromatic polyether, an aromatic polyester or an aromatic polysulphone.

4. Process according to claim 1, wherein the thermoplastic resin is a polycarbonate or an aromatic polyether.

5. Process according to claim 1, wherein the mixture is heated at 230°–300° C.

6. Process according to claim 1, wherein 0.1 to 2% by weight of a compound of the formula I is added.